(12) United States Patent
Yeh et al.

(10) Patent No.: US 7,415,151 B2
(45) Date of Patent: Aug. 19, 2008

(54) 3D COLOR INFORMATION ACQUISITION METHOD AND 3D COLOR INFORMATION ACQUISITION DEVICE

(75) Inventors: Yuan-Hao Yeh, Hsinchu (TW); I-Cheng Chang, Hsinchu (TW); Ching-Long Huang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 879 days.

(21) Appl. No.: 10/667,322

(22) Filed: Sep. 23, 2003

(65) Prior Publication Data

US 2004/0258297 A1    Dec. 23, 2004

(30) Foreign Application Priority Data

Jun. 20, 2003    (TW)    .............................. 92116840 A

(51) Int. Cl.
    *G06K 9/00*    (2006.01)
(52) U.S. Cl. .................................................... 382/154
(58) Field of Classification Search ................ 382/130, 382/131, 132, 154, 285; 358/474, 493, 494; 345/419–427, 653, 664, 679; 352/41, 42, 352/47, 48, 49, 61, 89; 348/135, 136
    See application file for complete search history.

(56) References Cited

U.S. PATENT DOCUMENTS

| | | | |
|---|---|---|---|
| 6,341,016 B1 * | 1/2002 | Malione ..................... | 356/603 |
| 6,549,288 B1 | 4/2003 | Migdal et al. | |
| 6,775,403 B1 * | 8/2004 | Ban et al. ..................... | 382/154 |
| 6,853,458 B2 * | 2/2005 | Yahashi et al. ............... | 356/604 |
| 6,965,690 B2 * | 11/2005 | Matsumoto .................. | 382/154 |
| 7,013,040 B2 * | 3/2006 | Shiratani ..................... | 382/154 |
| 7,092,563 B2 * | 8/2006 | Shiratani ..................... | 382/154 |
| 7,146,036 B2 * | 12/2006 | An Chang et al. ........... | 382/154 |
| 7,164,789 B2 * | 1/2007 | Chen et al. ................... | 382/154 |
| 7,239,312 B2 * | 7/2007 | Urisaka et al. ............... | 345/419 |
| 2002/0075456 A1 | 6/2002 | Shiratani | |
| 2003/0026475 A1 * | 2/2003 | Yahashi et al. .............. | 382/154 |
| 2004/0151365 A1 * | 8/2004 | An Chang et al. ........... | 382/154 |

FOREIGN PATENT DOCUMENTS

WO    WO 00/70303 A1    11/2000

* cited by examiner

*Primary Examiner*—Brian Q Le
(74) *Attorney, Agent, or Firm*—Birch, Stewart, Kolasch & Birch, LLP

(57) ABSTRACT

A method of acquiring 3D color information and a 3D color information acquisition apparatus, suitable for obtaining a 3D model of an object, use a pattern light source to acquire topography data for the object. More than 3 basic colors are used to construct the pattern to increase resolution with great number of color combination. According to the color composition and combination, color distortion caused by model projection can be prevented, thereby increasing the reliability and broadening the application of the color acquisition device and method.

2 Claims, 9 Drawing Sheets

3D COLOR INFORMATION ACQUISITION METHOD AND 3D COLOR INFORMATION ACQUISITION DEVICE

This nonprovisional application claims priority under 35 U.S.C. § 119(a) on Patent Application No. 092116840 filed in TAIWAN on Jun. 20, 2003, which is herein incorporated by reference.

BACKGROUND OF THE INVENTION

1. Field of Invention

The present invention relates to a 3D (three dimension) color information acquisition method and a 3D color information acquisition apparatus for use in 3D model imaging with high resolution. More particularly, the present invention relates to a 3D color information acquisition method and apparatus using more than 3 of major colors to encode a pattern and increase image resolution with a considerable reliability.

2. Related Art

Many 3D image acquisition methods have been provided in the prior art. One approach uses laser to scan topography of an object placed inside a box and to acquire colors of the object. Such a method requires expensive equipment and is time-consuming, which is not very practical in use. Another approach is to project a pattern in the form of color bands or color blocks on an object. A location of every color band or block is determined and compared to that of a reference pattern. Depth data of the object are calculated by using triangle distance measurement.

The profile, texture and material greatly affect the data acquisition for the object. Usually, the number of major constituting colors is 3 or 4 in view of stability. If the number of major constituting colors is higher than 4, then it is difficult to recognize the colors of the object when the pattern is projected on the object. If the number of major constituting colors is lower than 3, then this type of method is not suitable for use in encoding a large-size and high-density object image. It is an important issue to balance the resolution and the stability.

WO 00/70303 uses three basic colors, i.e., Red, Green, and Blue for color encoding. US 2002/0075456 uses four basic colors for color encoding. When the number of basic constituting colors is small, the total number of encoded color bands is small. In WO 00/70303, the number of encoded color bands is less than 100, while in US 2002/0075456 it is less than 64, which are not enough for the requirement of resolution in the current color image field. WO 00/70303 further teaches forming a redundant pattern at a center of the pattern to increase the number of encoded color bands, with a black region between two adjacent color bands. U.S. Pat. No. 6,549,288 uses gradual variation in intensity of light to form structured light pattern. However, the redundant pattern may disappear due to unknown reasons, which causes encoding failure. Furthermore, the color bands are greatly influenced by the object conditions. Reducing color gradation may constitute a solution to satisfy the resolution requirement, but it only partially solves the problem.

SUMMARY OF THE INVENTION

It is therefore an object of the invention to provide a method of acquiring 3D color information and a 3D color information acquisition device that can increase the resolution of a 3D model and prevent color distortion caused by color pattern projection, thereby increasing the reliability and broadening the application of the color acquisition device.

The 3D color information acquisition method uses a common light source and a pattern light source to respectively acquire a texture image and a pattern image. The pattern image consists of more than 3 basic colors. The texture image is used to analyze the color composition of an object. Locations of color strips of the pattern light source correspondingly in the pattern image are calculated by boundary detection. The color of the pattern image relative to the pattern light source is determined and corrected to obtain data for the profile of the object. The 3D model of the object is calculated from the color composition, the topography and the profile data of the object.

The 3-D color information acquisition device of the invention includes a pattern light source, which provides a pattern image consisting of more than 3 basic colors. More than 3 basic colors increase the resolution and analysis reliability of color composition and combination.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below illustration only, and is thus not limitative of the present invention, and wherein.

DETAILED DESCRIPTION OF THE INVENTION

Figure 1:
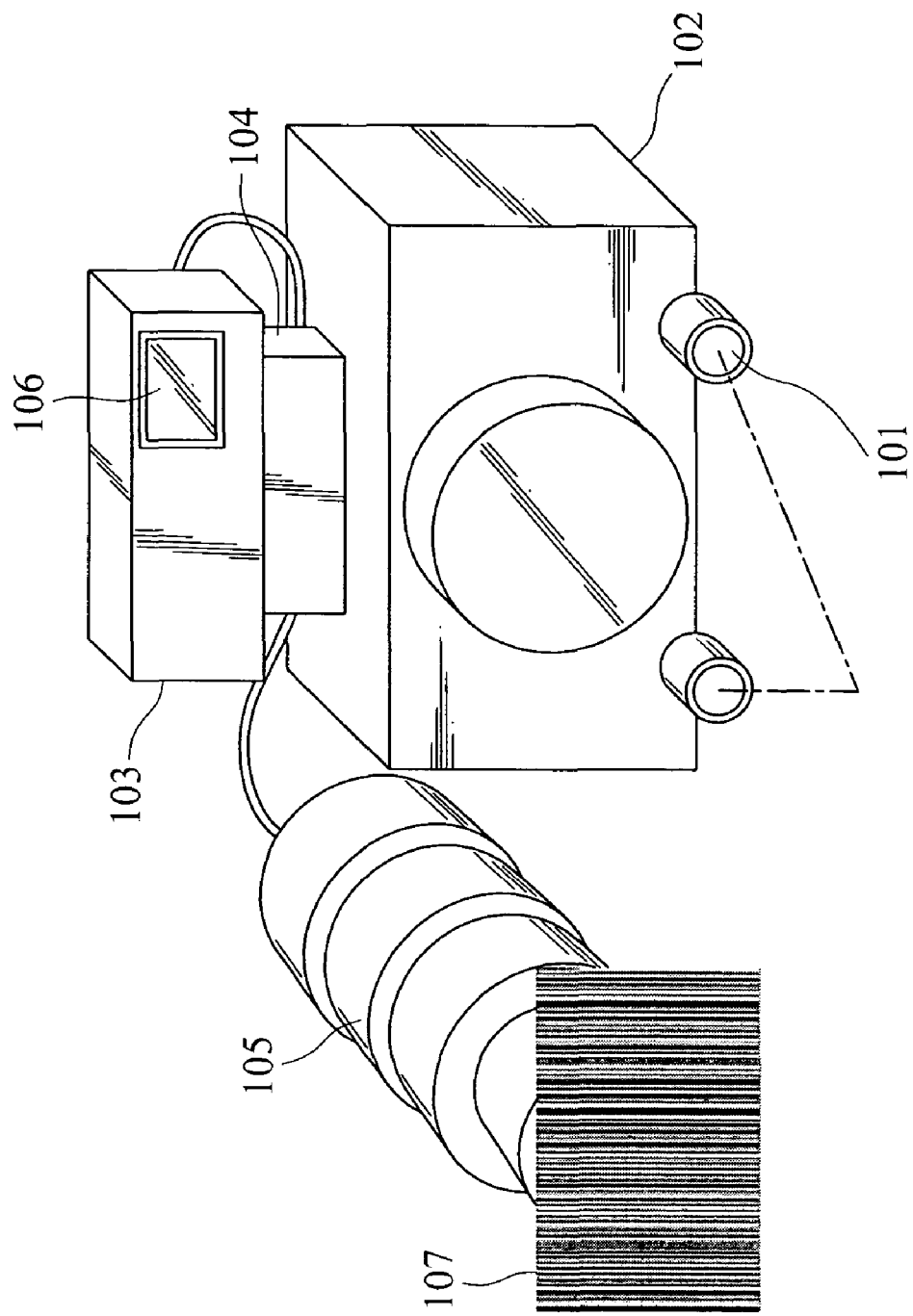
FIG. 1 is a schematic view of a 3D image acquisition apparatus according to one embodiment of the invention.

Referring to FIG. 1, a 3-D color information acquisition apparatus includes an image pickup device 102, an overhead flash 103 and a switch module 104. The image pickup device 102 further has a laser-positioning device 101 to evaluate a distance between the image pickup device 102 and a target object which image has to be taken. The locations of two laser points are adjusted to superimpose each other at a distance L from the image pickup device 102. If the L value is smaller, then the image acquisition range is smaller. If L value is greater, then the image acquisition range is larger. The image pickup device 102 may be, for example, a digital camera or a color CCD camera. The overhead flash 103 emits white light by a white light source 106 at a first shot. Before a second shot, the switch module 104 switches to a pattern light source from the white light source 106. The pattern light source includes an overhead pattern projector 105 (such as a flash) and a pattern film slide 107 to project the pattern light on the target object.

The pattern of the invention is encoded by more than three colors. In a preferred embodiment of the invention, the pattern of the invention is constructed by 6 colors, i.e., Red (255, 0, 0), Green (0, 255, 0), Blue (0, 0, 255), Cyan (0, 255, 255), Magenta (255, 0, 255), Yellow (255, 255, 0) to increase the image resolution and reliability of image analysis. Each of the colors is arranged orderly according to the sequence as listed in Table 1. For example, a Red color is followed by a Green, Blue and Cyan one, and a Green color is followed by Red, Blue and Magenta.

Various arrangements of the above colors generate N pattern strips, wherein N is usually 384 or 512, maximum 1024. Each pattern strip includes a plurality of encoding units for identification. In one embodiment of the invention, each encoding unit includes six colors sequentially listed from top to down of Table 1. Therefore, there are totally N-5 encoding units. Each encoding unit has a unique code to identify the location of the pattern strip.

TABLE 1

| Current color | Allowable adjacent color | | |
|---|---|---|---|
| | 1 | 2 | 3 |
| R (255, 0, 0) | G (0, 255, 0) | B (0, 0, 255) | C (0, 255, 255) |
| G (0, 255, 0) | R (255, 0, 0) | B (0, 0, 255) | M (255, 0, 255) |
| B (0, 0, 255) | R (255, 0, 0) | G (0, 255, 0) | Y (255, 255, 0) |
| C (0, 255, 255 | R (255, 0, 0) | M (255, 0, 255) | Y (255, 255, 0) |
| M (255, 0, 255) | G (0, 255, 0) | C (0, 255, 255) | Y (255, 255, 0) |
| Y (255, 255, 0) | B (0, 0, 255) | C (0, 255, 255) | M (255, 0, 255) |

Figure 2:
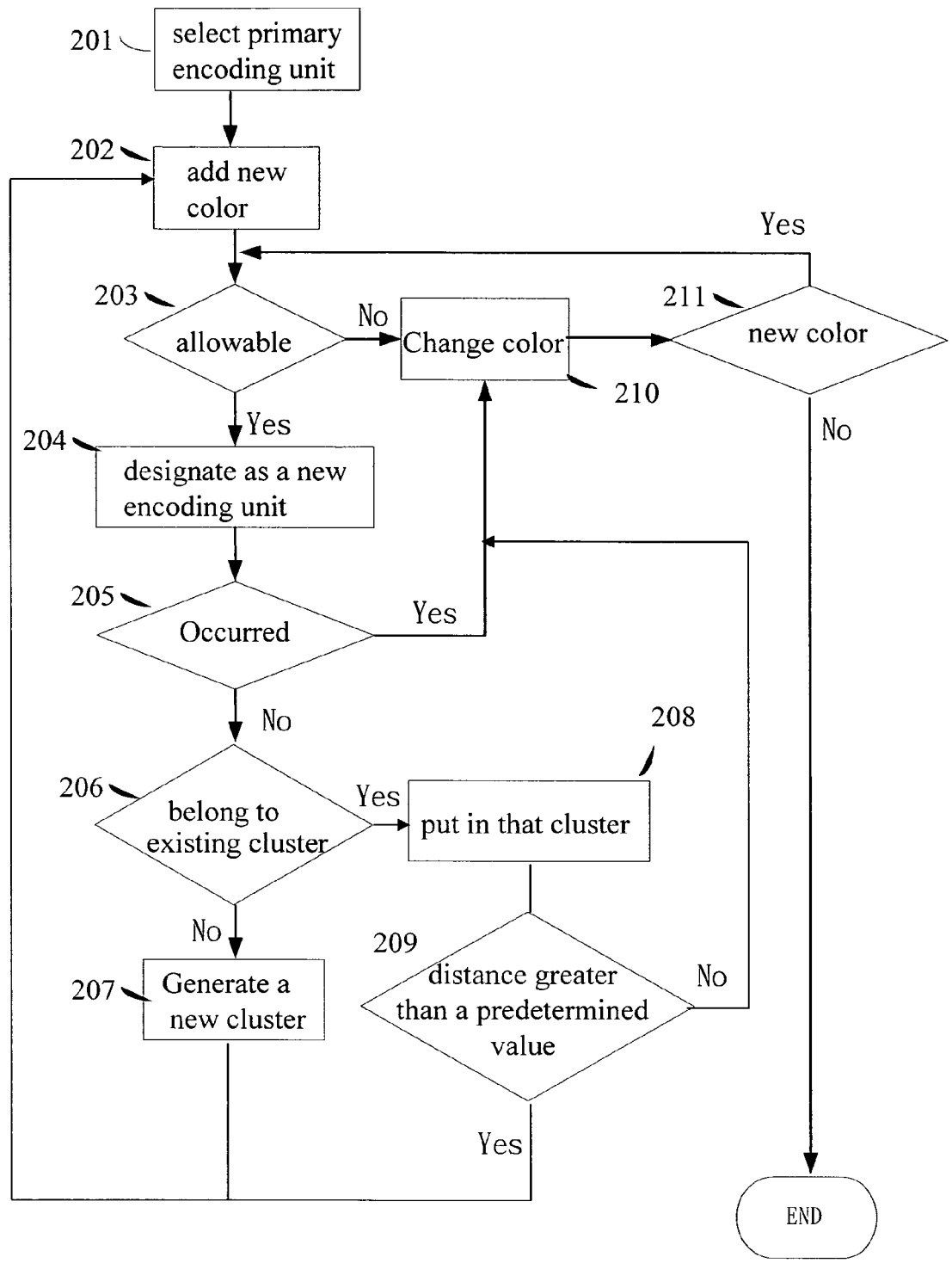
FIG. 2 is a flow chart of a pattern encoding process according to one embodiment of the invention.
Figure 8:
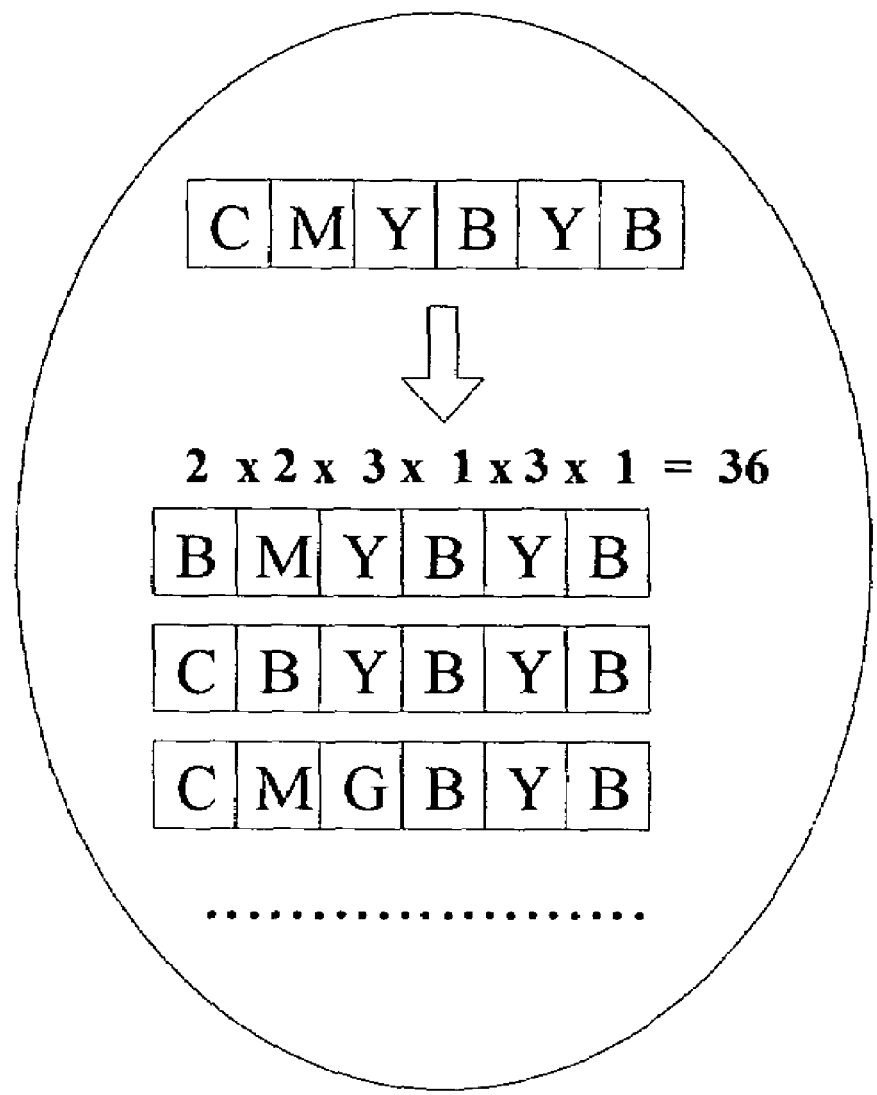
FIG. 8 is a schematic view of a cluster combination performed according to one embodiment of the invention.
Figure 10:
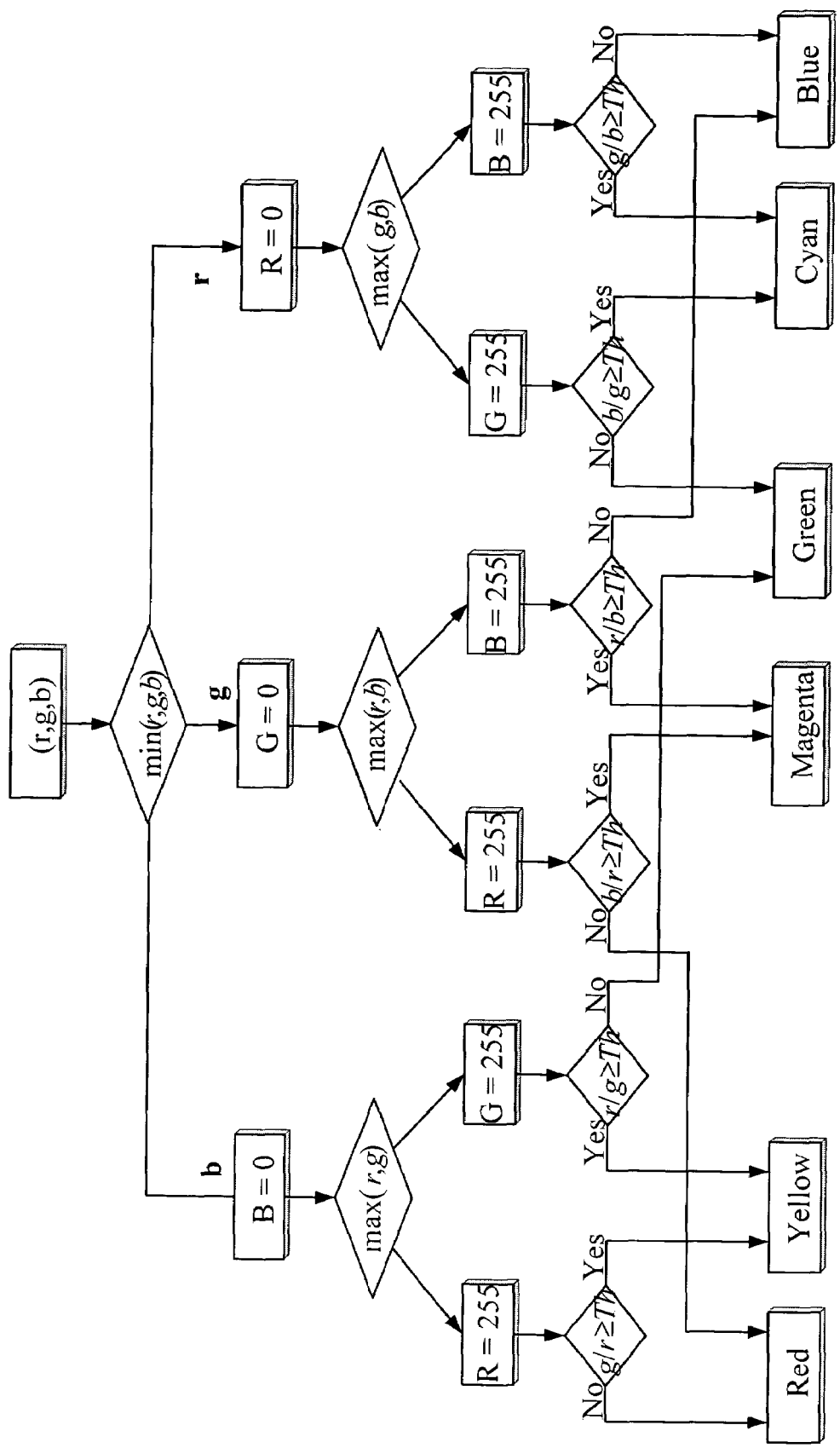
FIG. 10 illustrates an arithmetic of color evaluation.

FIG. 2 illustrates a flow chart of a process of generating a pattern. First, a primary encoding unit is manually selected (step 201). One of the basic colors is added behind the primary encoding unit including the last continuous six color elements (step 202). It is confirmed whether the arrangement of the color elements of the new color strip follows the color sequence as listed in Table 1 (step 203). If yes, this arrangement of color elements is designated as a new encoding unit (step 204). It is then checked whether the new encoding unit has occurred beforehand (step 205). If yes, then another color is selected (step 210); otherwise it is determined whether the new encoding unit belongs to one of the existing clusters (step 206). Table 2 and FIG. 8 illustrate the definition of a cluster. There may be erroneous color evaluation due to mathematical calculation imprecision. The mathematical calculation is illustrated in FIG. 10. All the encoding units erroneously and correctly evaluated are collected in one cluster. Erroneous color evaluation possibly happens in one cluster, while it is impossible to identify one encoding unit of one cluster as the encoding unit of another cluster erroneously. By locating each encoding unit within a specified range, any superimposition of the encoding units is prevented, correct identification of the encoding units can be thereby achieved.

If the encoding unit belongs to one of the existing clusters, then it is put in that cluster (step 208). It is then checked whether the encoding unit in question is spaced from other encoding units in the same cluster at a distance greater than a predetermined value (step 209). If not, then one of the basic colors is selected again (step 210). If the encoding unit in question does not belong to any of the existing clusters, then a new cluster is generated (step 207). The above steps are repeated until no new color is found according to the color combination rule of Table 1 (step 211). Thereby, a well-organized pattern with high resolution is accomplished.

Figure 3:
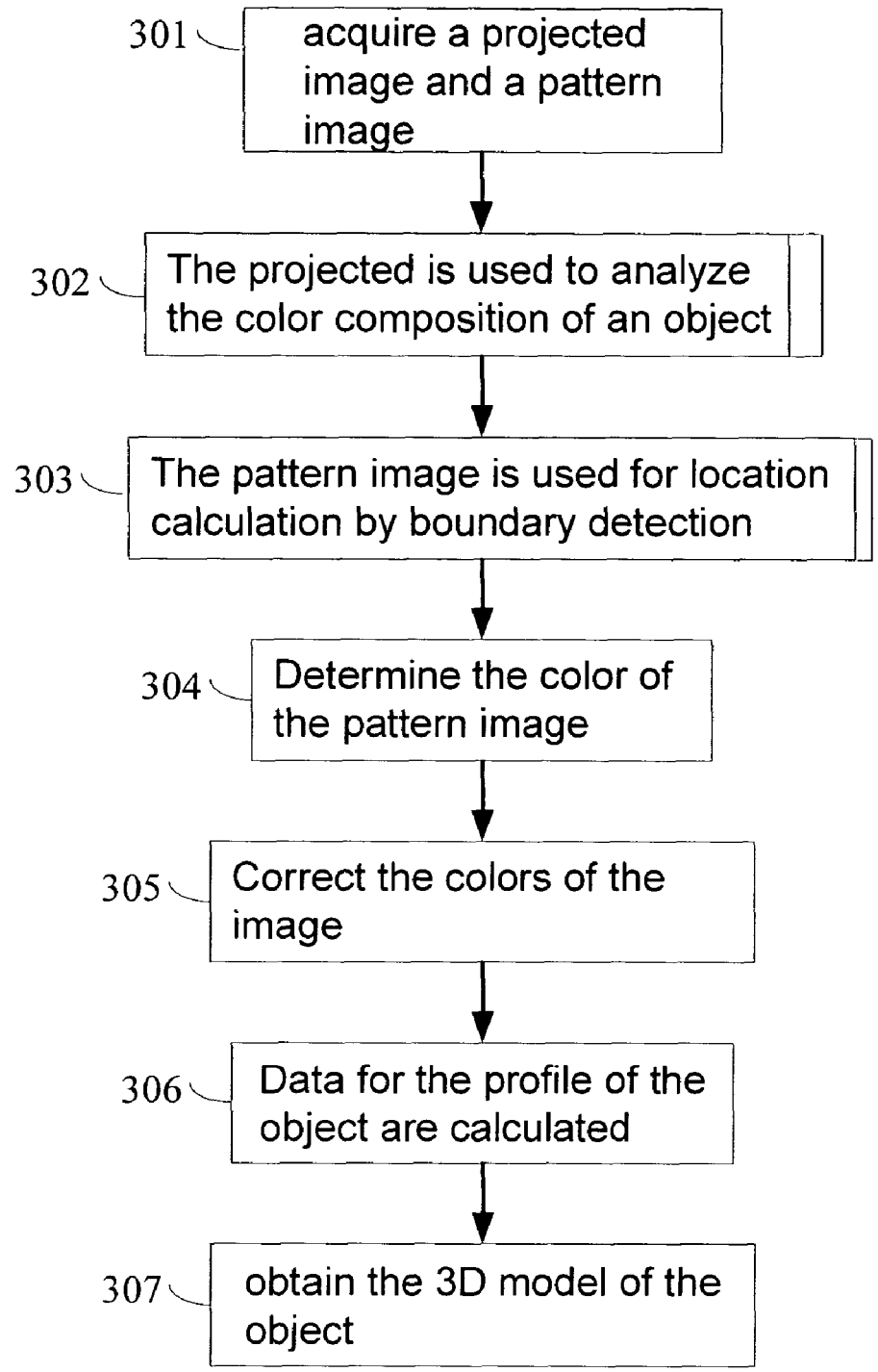
FIG. 3 is a flow chart of a 3D-information acquisition process from an object image according to one embodiment of the invention.

FIG. 3 illustrates a 3D image acquisition method according to an embodiment of the invention. A common light source and a pattern light source are respectively used to acquire a texture image and a pattern image (step 301). The projected image, which is acquired by the common light source, is used to analyze the color composition of an object (step 302). The pattern image, which is acquired by the pattern light source, is used for location calculation by boundary detection (step 303).

Figure 4:
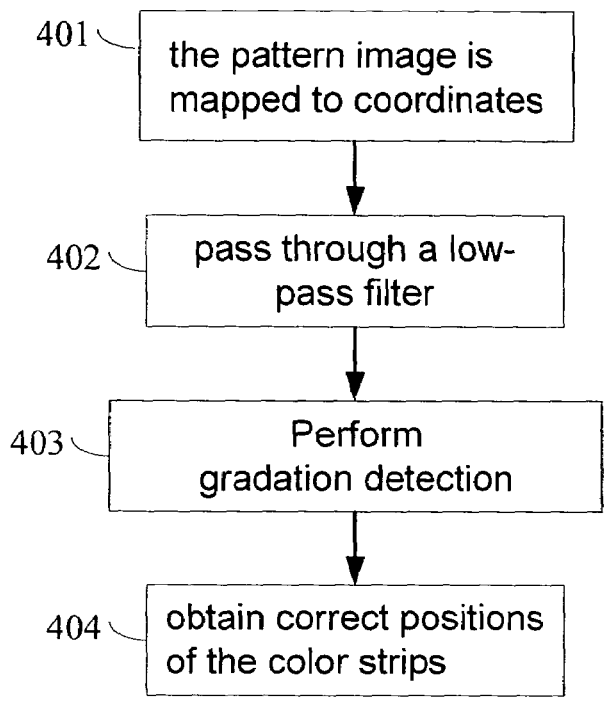
FIG. 4 is a flow chart of a boundary detection process according to one embodiment of the invention.
Figure 5:
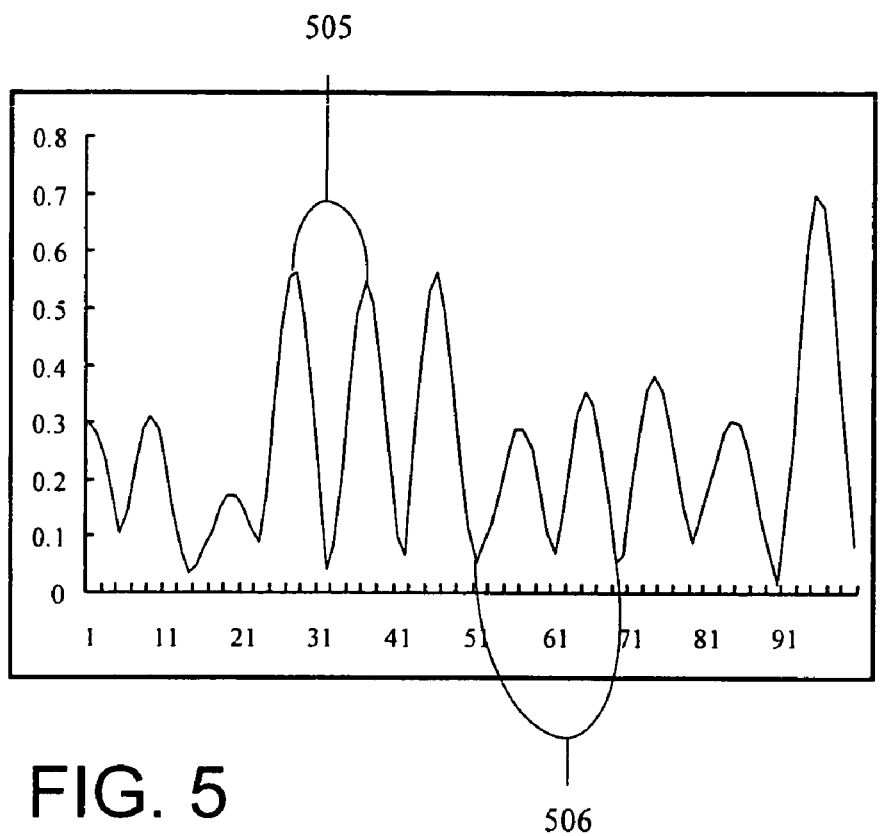
FIG. 5 is a schematic view of pattern image conversion coordinates according to one embodiment of the invention.
Figure 6:
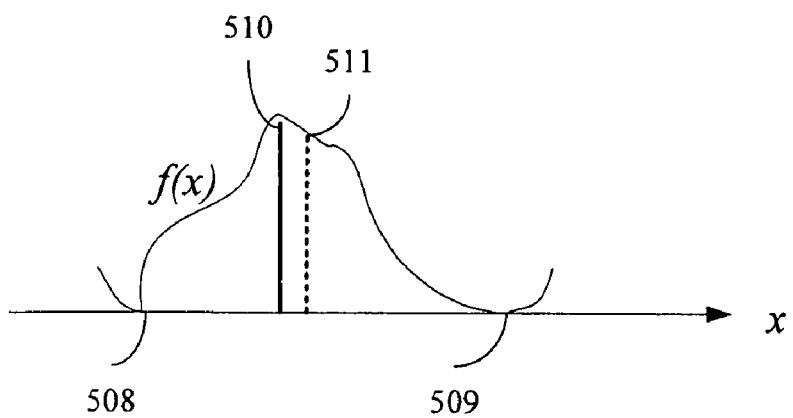
FIG. 6 is a schematic view illustrating trough calculation according to one embodiment of the invention.

FIG. 4 illustrates the location calculation process of the pattern image by boundary detection. The pattern image is mapped to coordinates (step 401) to separate hues and color brightness, for example. In order to reduce noise influence on the image boundary detection, the image is required to pass through a low-pass filter (step 402). Each scanning line from the low-pass filter has a YIQ value consisting of Y(x), I(x) and Q(x). After the scanning line has passed the low-pass filter, the YIQ value changes to be respectively: $Y_L(X)=L(x)*Y(x)$, $I_L(X)=L(x)*I(x)$, and $Q_L(x)=(L(x)*Q(x)$, wherein* is a convolution and $L(x)=[1, 2, 3, 2, 1]$. Then, gradation detection is performed (step 403) to obtain $Y_{GL}(x)=G(x)*YL(x)$, $I_{GL}(x)=G(x)*IL$, $Q_{GL}(x)=G(x)*QL(x)$, wherein $G(x)=[-2,-1,0,1,2]$. Absolute values of $Y_{GL}(x)=G(x)*YL(x)$, $I_{GL}(x)=G(x)*IL$, $Q_{GL}(x)=G(x)*QL(x)$, respectively, are calculated. These absolute values are summed up $(E(x)=abs(Y_{GL}(x))+abs(I_{GL}(x))+abs(Q_{GL}(x))$, and the resulting $E(x)$ value to $[0,1]$ is normalized to obtain the result of FIG. 5. A peak 505 is defined as a boundary line and a trough 506 is defined as a central line.

Sub-pixel precision can be further performed for this system. If there is a peak 510 between two troughs 508, 509 without further sub-pixel precision operation, then the number 510 is the maximum integer. A center of gravity position 511 of sub-pixels can be calculated by using the following equation to obtain correct positions of the color strips (step 404):

$$E = \int_{508}^{509} x \cdot f(x) dx \bigg/ \int_{508}^{509} f(x) dx$$

The color of the pattern image then is determined (step 304). By using the mathematical calculation method as shown in FIG. 10, each pixel of the pattern image is referred to one of the six colors and is given [R, G, B] values. Each of the R, G, and B ranges from 0 to 255. For example, if G is the smallest among the three values, then G is 0. Consequently, if R is greater than b, then R has the value 255. Finally, if B/R is greater than a critical value Th which is usually determined on the basis of experimental results (in this embodiment Th=0.7), then B has the value 255, otherwise B is 0. Any other mathematical calculation methods may be used to gauge the colors.

Subsequently, the colors of the image are corrected (step 305). When the pattern is projected on an object made of a special material, (person visage or china), the colors of the pattern on the object vary, which increases the probability of erroneous evaluation. In order to solve such a problem, the mathematical calculation set forth above is provided accompanied with a correction step.

Figure 7:
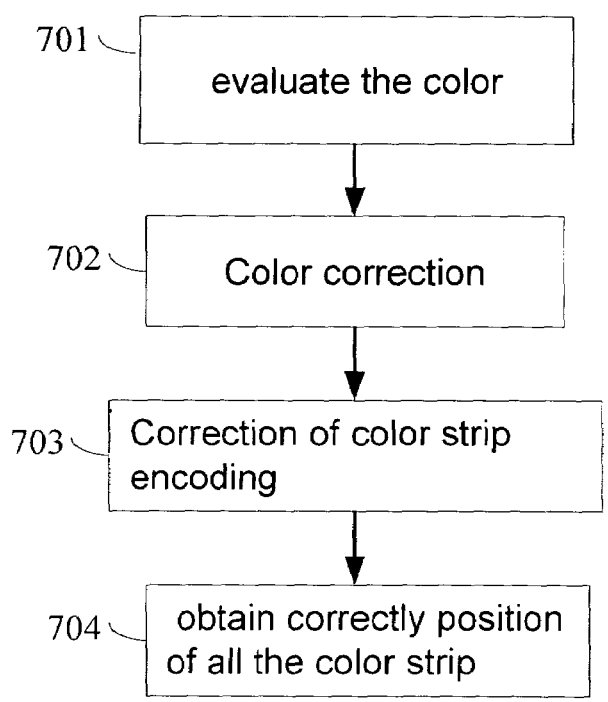
FIG. 7 is a flow chart of a pattern image color correction process according to one embodiment of the invention.

Referring to FIG. 7, it is first determined whether the color is correctly evaluated (step 701). Color correction is performed according to Table 2 and the definition of the cluster (step 702).

TABLE 2

| Evaluated color | R | G | B | C | M | Y |
|---|---|---|---|---|---|---|
| Possible color | R | G | B | B·C | B·M | G·C·Y |
| Amount of possibility | 1 | 1 | 1 | 2 | 2 | 3 |

Figure 9:
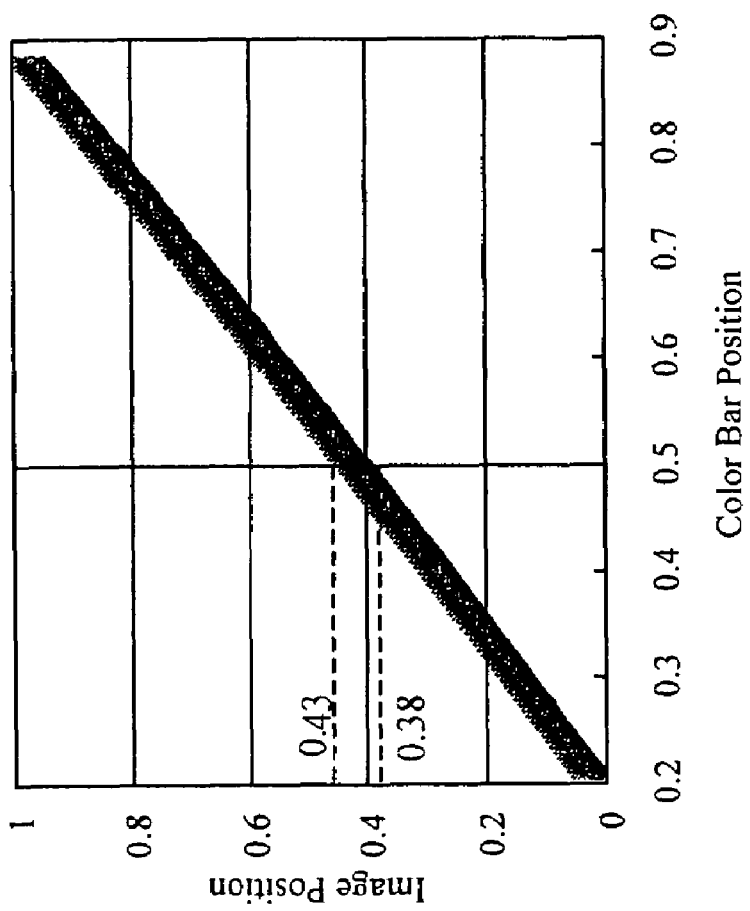
FIG. 9 is a schematic view illustrating the arrangement of pattern locations.

For example: the color which evaluated as Yellow, may be erroneously evaluated from Green or Cyan. In the case of a color strip that consists of 6 neighboring colors, the number of color combinations is about 36 colors, such as CMYBYB, BMYBYB or CBYBYB, among which only one is correct. Thereafter, the possibly correct color combinations are picked out. When one color strip is projected on the object, the color strip encoded according to the above-described way is located within a limited range. As shown in FIG. 9, one color strip located at 0.5 from a center of the pattern may be allowed to shift within 0.38-0.43 in pattern image according to its depth. Thereby, any color strips located with the specific range can be referred to a nearby correct one.

Figure 11:
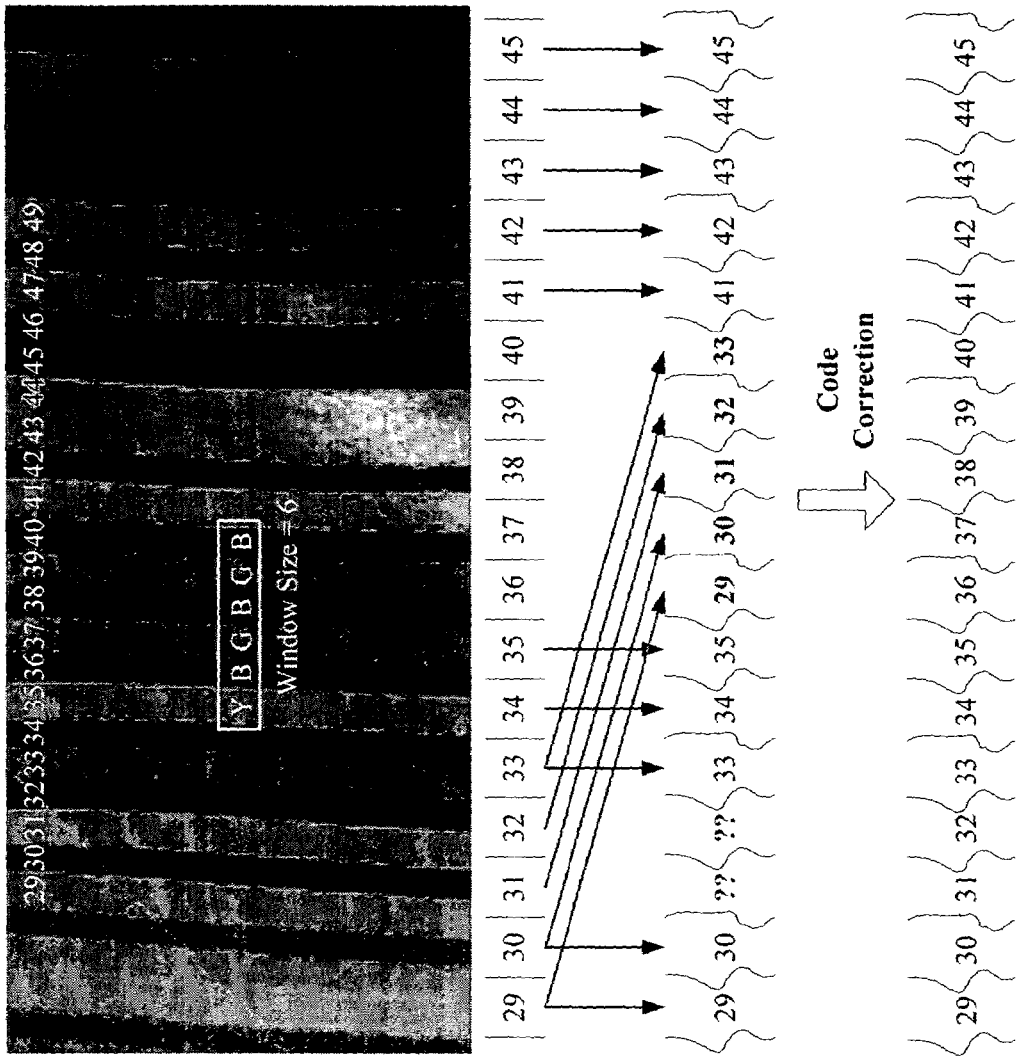
FIG. 11 is a schematic view showing encoding locations.

Correction of color strip encoding is performed at step 703. Referring to FIG. 11, each color strip is given a unique code, for example, STRIP 29 or STRIP 50. Most of the color strips can be correctly encoded, while some may be erroneously encoded. For example, two color strips STRIP 31 and STRIP 32 cannot find their corresponding locations, while there are two color strips lost between STRIP 30 and STRIP 32. It is confirmed that the lost strips must be STRIP 31- and STRIP 32. Furthermore, if there are 5 color strips lost between STRIP 35 and STRIP 41 while it is found that STRIP 29~STRIP 33 are wrongly encoded, then the lost color strips must be STRIP 36~STRIP 40 because the codes of the color strips should increase progressively. The correction of the color strip encoding is repeatedly performed until all the color strips are correctly positioned (step 704).

Data for the profile of the object are calculated (step 306) to obtain the 3D model of the object (step 307).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of generating a pattern constructed by more than 3 basic colors to acquire 3D color information, wherein a common light source and a pattern light source are used to respectively acquire a projected image and a pattern image to obtain a 3D model of an object, wherein the pattern light source provides the pattern constructed by more than 3 basic colors, comprising:

(a) selecting a primary encoding unit including a predetermined number of colors;

(b) adding a first of the more than 3 basic colors behind the primary encoding unit to form a first new encoding unit;

(c) confirming that an arrangement of the first new encoding unit follows a predetermined color sequence of adjacent colors;

(d) determining whether or not the first new encoding unit corresponds to any previous encoding unit;

(e) one of (e1) if the first new encoding unit corresponds to any previous encoding unit, adding a second of the more than 3 basic colors behind the primary encoding unit to form a second new encoding unit and repeating steps (c) and (d) until step (d) identifies a final new encoding unit that does not correspond to any previous encoding unit, and (e2) if the first new encoding unit does not correspond to any previous encoding unit, identifying the first new encoding unit as the final new encoding unit;

(f) determining whether or not the final new encoding unit can be associated with a pre-existing cluster in accordance with a predetermined association parameter;

(g) one of (g1) forming a new cluster if the final new encoding unit cannot be associated with a pre-existing cluster, (g2) assigning the final new encoding unit to the pre-existing cluster if the final new encoding unit can be associated with a pre-existing cluster, and if the final new encoding unit is spaced from pre-existing encoding units of the pre-existing cluster by a predetermined amount, and (g3) if the final new encoding unit can be associated with a pre-existing cluster, and if the final new encoding unit is not spaced from pre-existing encoding units of the pre-existing cluster by a predetermined amount, repeating steps (a) through (f) with another of the more than 3 basic colors; and (h) repeating the steps (a) through (g) until all of the more than 3 basic colors are processed.

2. The method of claim 1, wherein the predetermined number of colors includes 6 colors.

* * * * *